Feb. 9, 1926.                                      1,572,144
C. E. JOHNSON
STEAM COOKING UTENSIL
Filed Feb. 2, 1925
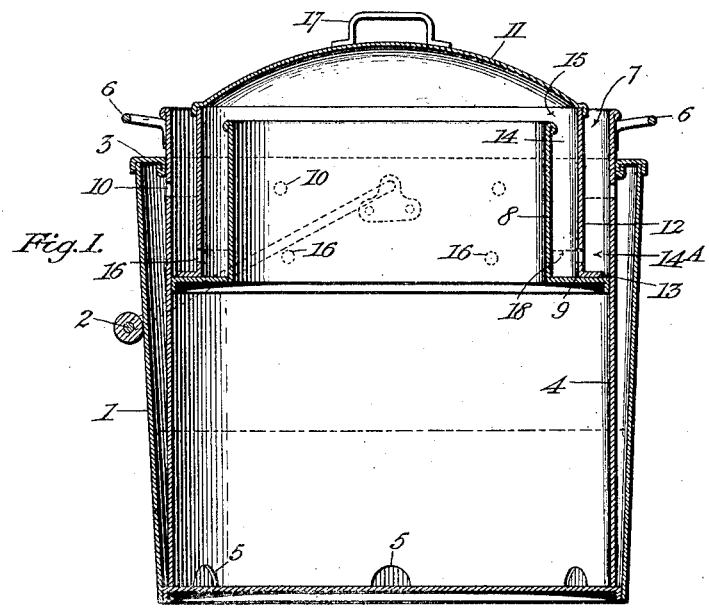
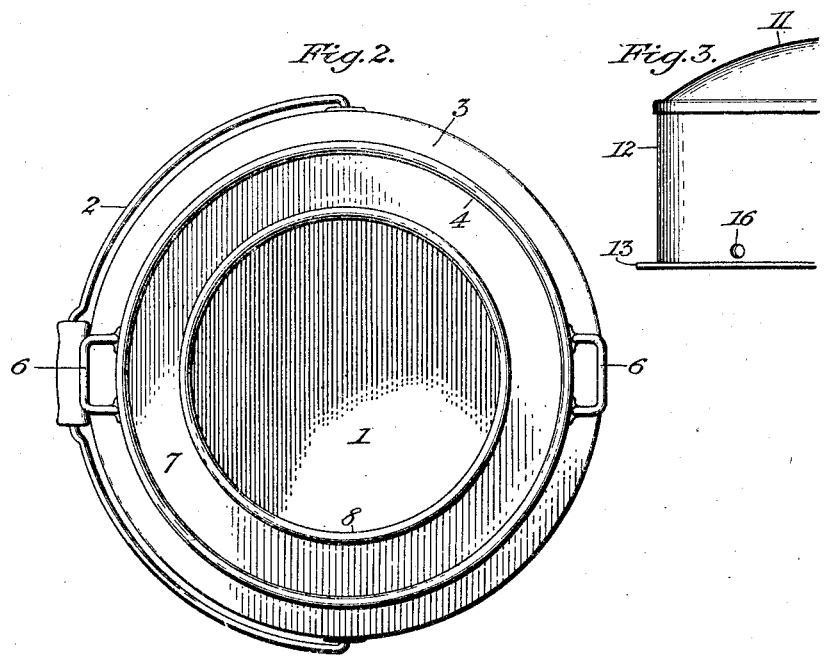
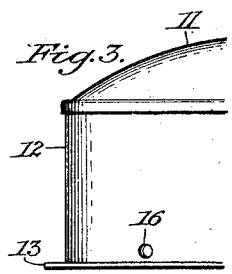
INVENTOR
Charles E. Johnson
BY
H. S. Bailey   ATTORNEY Patented Feb. 9, 1926.

1,572,144

UNITED STATES PATENT OFFICE.

CHARLES E. JOHNSON, OF DENVER, COLORADO.

STEAM COOKING UTENSIL.

Application filed February 2, 1925. Serial No. 6,307.

*To all whom it may concern:*

Be it known that I, CHARLES E. JOHNSON, a citizen of the United States of America, residing at the city and county of Denver and State of Colorado, have invented a new and useful Steam Cooking Utensil, of which the following is a specification.

This invention relates to improvements in steam cooking utensils.

The object of the invention is to provide a utensil of this character, in which the article to be cooked is subjected to a combined boiling and steaming action, by which it is thoroughly cooked in a much shorter time than is required with the use of the ordinary cooking vessel, the said utensil having a bottomless inner member provided with an annular water chamber in its upper end and a cover having a portion which enters said chamber and normally rests upon the bottom thereof, the water of condensation being caught in said chamber and forced by steam pressure to overflow into the main body of the utensil, said cover being automatically lifted under high pressure, thereby permitting the escape of the steam to atmosphere, and thus eliminating any possibility of explosion.

Further, to provide a steam cooker of this character which is so constructed that it can be much more cheaply manufactured than the present style of steam cookers, and which eliminates the use of valves and gauges, the arrangement being such that the cover for said cooker acts to confine the water of condensation, which is returned to the body of the vessel, said cover also acting to automatically permit the escape of steam under high pressure.

These objects are accomplished by the device illustrated in the accompanying drawings, in which:

Figure 1 is a vertical sectional view through the improved cooker.

Fig. 2 is a plan view of the same, the cover being removed; and

Fig. 3 is a side view of a portion of the cover for said cooker.

Referring to the accompanying drawings:

The numeral 1 indicates the main vessel, which may be of any desired size and which is provided with a common type of bail 2, though any other style of handle may be used in connection therewith. The top of the vessel has an opening of less diameter than the vessel, which is formed by securing a flat metal ring-like cap 3 on the rim of the vessel, as shown, the opening in the ring forming the entrance to the vessel. The vessel may be cylindrical in form, though it is preferably tapered slightly towards its bottom end.

Within the vessel 1 is placed a cylindrical inner member 4, which is open both at bottom and top. This inner member 4 fits slidably in the opening in the ring 3 and rests upon the bottom of the vessel 1, openings 5 being formed in the lower edge portion to form communication between the outer vessel 1 and the interior of the said inner member. The upper end of the inner member extends a short distance above the ring 3, and this extended portion is provided with handles 6, by means of which the inner member may be lifted out of the vessel 1, or placed therein. The upper portion of the inner member is provided with an annular water chamber 7, which is formed by a flat metal ring-like member 8, the lower edge of which terminates in a horizontal flange 9, which is soldered at its circumferential edge to the wall of the inner member, the said flange forming the bottom of the water chamber, while the band 8 forms the inner wall of the said chamber, as will be understood by reference to Figure 1 of the drawings. The inner member is provided with an annular row of holes 10, which are positioned to lie just below the ring 3, and these holes form communication between the annular chamber 7 and the main vessel 1. The band 8 forms the entrance to the inner member 4, and this entrance is closed by a special form of cover, which comprises a dome-shaped top or cap 11, having a depending annular ring-like member 12, which terminates in a horizontal flange 13. The ring-like body 12 is of a diameter to lie midway between the inner and outer walls of the annular chamber 7, and the flange 13 is adapted to rest upon the bottom 9 of the said annular chamber, thus supporting the cover. It will thus be seen that a space 14 is defined between the inner wall of the annular chamber 7 and the ring-like member 12 of the cover, and a space 14^A between said ring-like member and the outer wall of the chamber 7, and a space 15 is also defined between the cap 11 and the inner wall of the chamber 7, to permit the water of condensation which collects on the cap to pass into the chamber 7, as will be more particularly mentioned hereinafter. The ring-like portion of the cover is provided with a row of holes 16 adjacent the flange 13, for a purpose to be presently explained. The cover is provided with a handle 17.

In practice, the cooker is arranged as shown in Figure 1, and the cover being removed, a suitable amount of water is supplied through the opening in the inner member 4, and the openings 5 in the lower end of the inner member permit the water to enter the outer vessel, in which it rises to the same level as in the inner member. The annular chamber 7 is then filled with water to the level of the holes 10, and the article or articles to be cooked are placed in the inner member, after which the cover is placed in the annular chamber so as to rest on the bottom of said chamber, the flange 13 of said cover serving to center the cover with respect to the chamber 7. As the water in the vessel becomes heated, the vapor condenses on the under side of the cover and trickles down into the space 14, and when the water boils, the steam pressure acting on the water in the space 14, forces it down to the level of the holes 16, as indicated by the dotted line 18, and the water in the space 14$^A$ overflows through the holes 10, into the outer vessel. Under low pressure, the weight of the cover prevents it from rising, but as soon as the pressure against the under side of the cover is sufficient to overcome its weight the cover rises, and at the same time the level of the water in the space 14$^A$ falls until it reaches the level of the row of holes 16 in the cover, when the steam escapes through the holes 16 to the atmosphere through the space 14, and the water in the spaces 14 and 14$^A$ is again on the same level. Thus the cover is lifted as often as the pressure in the cooker is sufficient to overcome the weight of the cover, thereby permitting the escape of steam through the holes 16. A slight space is left between the circumferential edge of the flange 13 and wall of the inner member 4, which permits the cover to move freely up and down under the action of the steam, but the flange prevents lateral movement of the cover during its up and down movement.

It will thus be seen that the vapor from the heated water does not escape to the atmosphere, but condenses on the under side of the cover, and then trickles down into the space 14, and not until the pressure in the cooker is high enough to lift the lid, does the steam escape to the atmosphere. Thus the food in the cooker is subjected to a combined boiling and steaming treatment by which it is not only cooked in a relatively short time, but it is thereby made tender and none of its natural flavor is lost, and as the vapor does not escape, but condenses on the cover and returns to the vessel again in the form of water, the original water supply is thus made to last much longer than it would with the ordinary cooking vessel.

Having described my invention, what I claim as new and desire to secure by Letters Patent, is:

1. In a cooking utensil of the character described, a main vessel having a contracted opening at its upper end, a bottomless inner member which fits in said contracted opening and rests upon the bottom of said main vessel, an annular wall in the upper portion of said inner member and spaced from the same, which terminates at its lower edge in a flange which is secured to the wall of the inner member above the middle portion thereof, thereby forming an annular chamber in the upper portion of the inner member, and a cover having a depending cylindrical portion of greater diameter than said annular wall, which rests upon the bottom of said annular chamber, a space being left between the upper end of said annular wall and said cover.

2. In a cooking utensil of the character described, an outer vessel, an inner bottomless member separated from the outer vessel by a surrounding space and resting on the bottom of said vessel, the surrounding space being closed at its upper end, a circular wall in the upper portion of the bottomless member, having a horizontal flange on its lower end, which is secured to the wall of the bottomless member, thereby forming an annular chamber between the circular wall and the wall of the bottomless member, a covered member which surrounds the circular wall and rests upon the bottom of the annular chamber, a space being left between the covered member and the circular wall, between the covered member and the wall of the bottomless member and between the upper edge of the circular wall and the top of said covered member, said bottomless member having openings in its lower end and near its upper end, and said covered member having openings near its bottom end.

3. In a cooking utensil of the character described, an outer vessel, an inner cylindrical bottomless removable member of greater depth than the vessel, which rests on the bottom of the vessel and is spaced from the wall of the same, a ring-like cover on the upper end of the outer vessel, in which the bottomless member fits, the lower end portion of the bottomless member having openings which form communication between the surrounding space and the interior of the said bottomless member, a flanged wall in the upper end portion of the bottomless member and spaced therefrom to form an annular chamber, said flange being soldered to the wall of the inner member to form the bottom of said chamber, a cover having a circular depending portion of greater diameter than said circular wall, which terminates at its lower end in a flange which is adapted to rest on the bottom of the annular chamber, a space being left between the said depending portion and the circular wall, between the depending portion and the wall of the bottomless member, and between the top of the cover and the circular wall, openings being formed in the lower portion of the depending portion of the cover and in the upper portion of the wall of the bottomless member, the latter openings forming communication between the said annular chamber and the space surrounding the bottomless member.

4. In a cooking utensil of the character described, a main vessel having a contracted opening at its upper end, a removable bottomless member which fits in said opening and rests upon the bottom of the main vessel, said removable member extending above the top of the main vessel, an annular chamber in the upper portion of the removable member, a cover having a depending band-like portion which enters the said annular chamber and rests upon the bottom thereof, said band-like member terminating in a horizontal flange and being spaced from the walls of the annular chamber, openings being formed in said band-like member adjacent the flange thereof, and in said removable member adjacent the top of the main vessel, and within the same, and in the lower edge portion of said removable member.

5. In a cooking utensil of the character described, a main vessel having a contracted entrance opening, a removable bottomless cylindrical member which fits in said opening and rests upon the bottom of the vessel, said removable member having an annular chamber in its upper end, a cover having a depending cylindrical portion which enters the annular chamber and rests upon the bottom thereof, openings being formed in the upper and lower end portions of said removable member.

In testimony whereof I affix my signature.

CHARLES E. JOHNSON.